United States Patent [19]
Yasukawa et al.

[11] 4,147,887
[45] Apr. 3, 1979

[54] ELECTRIC SMELTING FURNACE

[75] Inventors: Shozo Yasukawa, Yokosuka; Kenji Matsuda, Matsudo, both of Japan

[73] Assignee: Ishikawajima-Harima Jukogyo Kabushiki Kaisha, Tokyo, Japan

[21] Appl. No.: 817,259

[22] Filed: Jul. 20, 1977

Related U.S. Application Data

[63] Continuation-in-part of Ser. No. 602,137, Aug. 5, 1975, abandoned.

[51] Int. Cl.$^2$ .............................................. H05B 7/107
[52] U.S. Cl. ..................................................... 13/18 B
[58] Field of Search .................................. 13/18, 12, 9

[56] References Cited

U.S. PATENT DOCUMENTS

| | | | |
|---|---|---|---|
| 1,442,033 | 1/1923 | Sem et al. | 13/18 |
| 3,524,004 | 8/1970 | Van Nostran et al. | 13/18 |
| 3,952,138 | 4/1976 | Nanjyo et al. | 13/12 |

Primary Examiner—R. N. Envall, Jr.
Attorney, Agent, or Firm—Scrivener, Parker, Scrivener & Clarke

[57] ABSTRACT

An electric smelting furnace in which a hollow electrode with the wall thickness depending upon the depth of current penetration is disposed vertically within the furnace and spaced by a desirable distance from the furnace bottom, and the top of the hollow electrode is connected to a duct for discharging the furnace off-gases and charging the raw materials into the furnace after they are preheated by the furnace off-bases in the duct and prereduced in the hollow electrode.

10 Claims, 3 Drawing Figures

ELECTRIC SMELTING FURNACE

This application is a continuation-in-part of our application Ser. No. 602,137 filed Aug. 5, 1975 now abandoned.

The iron and steel making processes are classified as the electric smelting process, the direct reduction process, the blast furnace process and so on.

For example, in the conventional electric smelting process, the charge consisting of ore, semi-reduced pellets' fluxes and a reducing agent such as coal is charged into a furnace a of a relatively low height as shown in FIG. 1, and electric power is supplied to a Soderberg electrode c disposed substantially in line with the axis of the furnace a to produce the arc between the charge and the tip of the electrode c. The ore or pellets are then reduced and melted by the heat of the arc and the Joule heat generated within the charge, and molten pig iron is produced.

The electric smelting process of the type described, however, has many problems. First of all, the power cost is high (about 1,500 to 2,000 KWH/ton of molten pig iron) because the energy required for reducing and melting the charge is mainly supplied by the electric power. Secondly, since the furnace height h is low, the heat exchange between the charge and the combustion gases produced in the furnace a is not sufficient and then thermal efficiency is low. As a result, the production capacity of such furnace is limited and, for instance, the production capacity of the largest existing furnace of 50 MVA is of the order of 10 to 15 million tons per year, and this is insufficient even for a small integrated steel mill to be referred as "a mini-mill" with a production capacity of 50 to 100 million, tons per year.

The depth of current penetration into the electrode is given by the following equation:

$$\delta = \frac{1}{2\pi} \sqrt{\frac{\rho}{\mu f \times 10^{-9}}} \quad \text{(cm)}$$

$$\delta = \frac{10^4 \sqrt{10}}{2\eta} \sqrt{\frac{\rho}{\mu f}} \quad \text{(cm)}$$

$$\text{Therefore } \delta \doteq 5030 \sqrt{\frac{\rho}{\mu f}} \quad \text{(cm)}$$

where
$\rho$ = specific resistance of the electrode $\Omega$-cm;
$\mu$ = specific permeability of the electrode; and
$f$ = frequency, cycles per second.

Therefore, in case of the electric furnace using three-phase of 50 cycles/sec with $\rho = 2 \times 10^{-3}$ ohm-cm (in case of graphite electrode) and $\mu$ = about unity (dimensional quantity), the depth of current penetration $\delta$ is 35 cm. Therefore, the effective diameter of the electrode is $$d = 2\delta = 70 \text{ cm.}$$

However, for the capacity of 50 MVA and the required electrode current of about 70 KA, the diameter of the electrode must be about 160 cm. As a consequence, sufficient current penetration cannot be attained within the area of diameter 90 cm(= 160 − 70) from the center of the electrode, so sufficient self-burning at the internal part of the electrode will not occur. As a result the components of the internal part of the electrode are occasionally broken out into the furnace. Thus, the capacity of the electric furnaces is also limited from the dimensions of the electrodes.

The above equation is generally known and used in electrothermics. (For example, the equation is mentioned in "ENGINEERING ELECTRO-HEATING HANDBOOK" edited by Japan Electric Engineering Committee (Nippon Denki-Kogaku Iinkai). The depth of current penetration is generally derived by the equation set forth above. When electric power is supplied from the alternating current source of 50-60 Hz through the electrode, the current is concentrated on the area of equivalent distance $\delta$ from the surface of electrode which is determined by the depth of current penetration so that the current is difficult to flow effectively into the inside of the electrode. This phenomenon is called the skin effect. In order to raise the production capacity of the furnace by heightening the input by means of passing high electric current from the alternating current source through the electrode, the effective diameter of a solid (non-hollow) electrode should be selected within the region given by the equation:

$$d = 2\delta = 2 \times 5030 \times (\rho/\mu f)^{\frac{1}{2}} \text{ [cm]}.$$

In case this region is not taken into consideration and the diameter of the solid electrode is enlarged, electric current does not penetrate the center of electrode: accordingly, in the case of the Soderberg Electrode, the center thereof is not fully baked and, as a result, the components of the internal part of the electrode are occasionally broken out into the furnace, and the stability of operation cannot be maintained. To solve the above fundamental problem, the present invention provides a hollow electrode having a wall thickness in proportion to depth ($\delta$[cm]) of current penetration, which enables charging of iron material at the hollow part thereof; accordingly, the optimum diameter of the hollow electrode may be selected in response to the required electrode-current I [KA] so as to raise the production capacity of the furnace by heightening of the input free from the breakdown of any un-baked electrode-portion.

Recently, the various sponge iron produced by various direct reduction processes have been used as one of the iron sources for the steelmaking by the electric arc furnace operation. In order to produce the molten steel in the electric arc furnace using sponge iron at a competitive production cost level with that of the molten steel produced by L/D converter operation combined with a blast furnace, the highly metallized sponge iron produced from the high quality ore with high iron content and low gangue content must be used. However, there are now some unsolved problems such as process temperature control or reoxidation of highly metallized sponge iron in the view point of producing the sponge iron and such as hot charging of sponge iron in the view point of the electric arc furnace operation.

In a blast furnace process, as is well known, the coking coal is essentially required and more economical advantages of the blast furnace process can be attained by a larger capacity. Therefore, a very large investment cost will be required in new blast furnace construction and furthermore there are limitations about the installation site and the raw materials such as coal.

In view of the above, one of the objects of the present invention is to provide an electric smelting furnace which does not require the same bituminous coal as in the blast furnace process and eliminates problems due to the quality of sponge iron.

Another object of the present invention is to provide an electric smelting furnace which is flexible in the installation site, construction, operation and capacity.

A further object of the present invention is to provide an electric arc furnace which has a high thermal efficiency and minimizes the atmospheric pollution.

The present invention is therefore to provide a steelmaking process which may sufficiently encounter the problems of the degradation of the qualities of iron ore, coal and other raw materials, the energy saving problem, and so on and which may suitably adjust the production capacity.

The above and other objects, features and advantages of the present invention will become more apparent from the following description of one preferred embodiment thereof taken in conjunction with the accompanying drawings in which.

Figure 1:
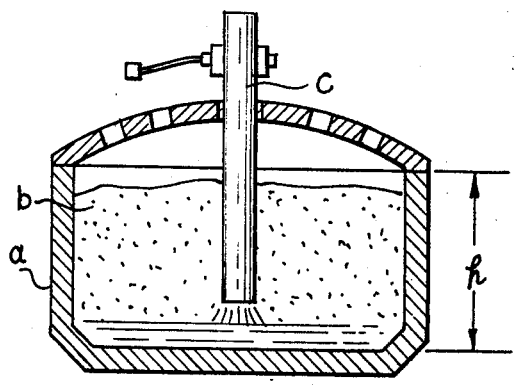
FIG. 1 is a schematic vertical sectional view of a conventional electric smelting furnace.
Figure 2:
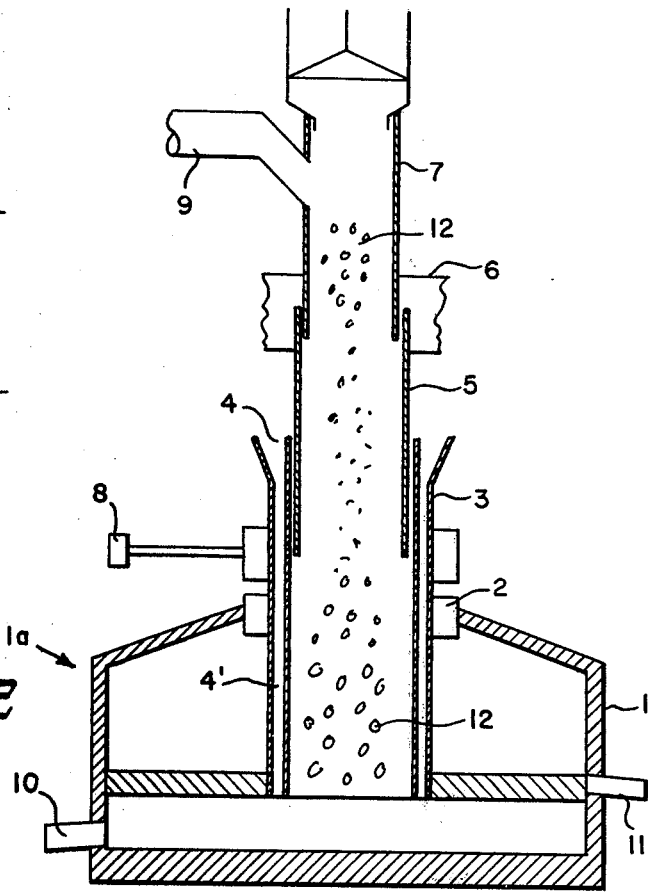
FIG. 2 is a schematic sectional view of an electric smelting furnace in accordance with the present invention.

Referring to FIG. 2, reference numeral 1 denotes a closed-roof furnace body at the center of which is disposed a hollow electrode 3 with a water cooling device 2. The wall thickness of the electrode 3 is dependent upon the depth $\delta$ of current penetration explained above. The top of the hollow electrode 3 is opened as indicated by 4 so that the self-burning electrode agent may be charged into the space 4'.

Into the upper hollow portion of the electrode 3 is inserted a duct 5 for discharging the gases and charging the raw materials into the furnace, and the upper end of the duct 5 is connected through a flexible tube 6 to a duct 7 which serves not only for discharging the furnace gases but also for charging the raw materials. The flexible tube 6 is provided in order to adjust the position of the hollow electrode 3 in response to the consumption of the self-burning electrode agent and to control the current flowing through the electrode 3. Moreover, the flexible tube 6 serves as an insulator between the electrode 3 and the duct 7.

Reference numeral 1a denotes an electric smelting furnace; 8, a power source; 9, an exhaust gas duct; 10, a molten steel discharge spout; 11, a slag discharge spout; and 12, the charge consisting of iron ore, pellets, semi-reduced iron, coal and dolomite.

The charge is continuously charged into the hollow electrode 3 through the ducts 7 and 5, and is melted by the heat of the arc produced between the tip of the electrode 3 supplied with the power from the power source 8 and the Joule heat produced within the charge. Within the hollow portion of the electrode 3, the prereduction of oxides in the charge 12 proceeds, and when the furnace off-gases are discharged through the ducts 5 and 7, they pre-heat the charge 12 and the dust in the furnace off-gases is trapped.

Molten steel or pig iron is discharged through the spout 10 while the slag, through the spout 11. Water is circulated through the water cooling device 2 by means (not shown) so as to cool the electrode 3, thereby preventing the overheating thereof.

As the charge 12 is melted, the electrode agent is burned out so that the supply of the self-burning electrode agent into the space 4' is effected through the opening 4. The flexible tube 6 is lifted or lowered and its length is suitably adjusted so that the current flowing through the electrode 3 may be controlled.

Figure 3:
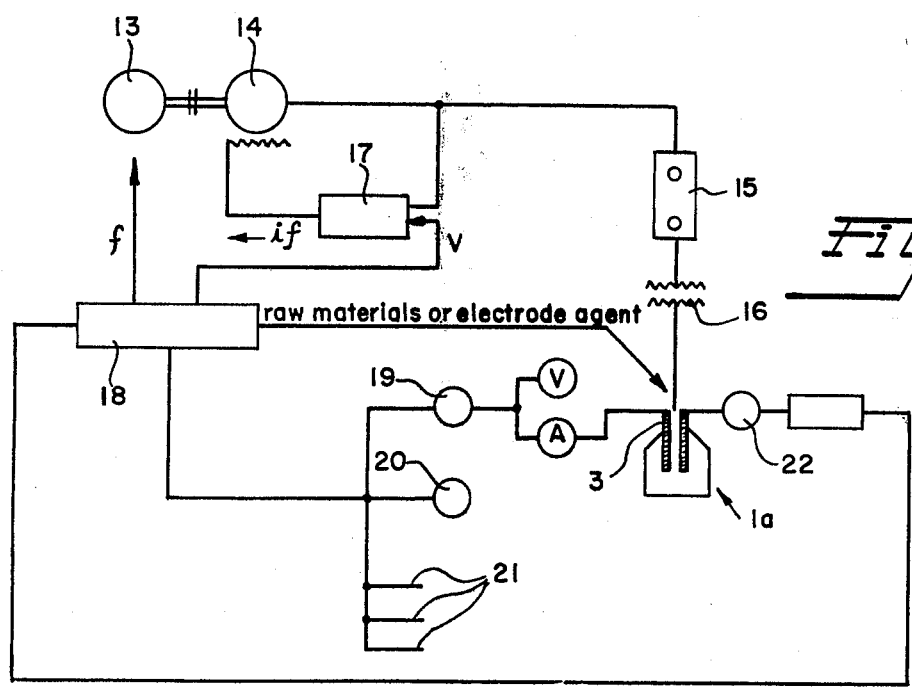
FIG. 3 is a diagram of a control system thereof.

Referring to FIG. 3 showing the diagram of the control system of the electric smelting furnace shown in FIG. 2, reference numeral 1a denotes the electric furnace; 3, the hollow electrode; 13, a diesel engine or gas or steam turbine; 14, a generator; 15, an interruptor; 16, a transformer; 17, an automatic voltage regulator; 18, a total system controller; 19, a power meter; 20, a power-factor meter; 21, process control data transmission lines; 22, a motor for adjusting the position of the hollow electrode 3; V, a voltage meter; and A, an ampere meter.

The generator 14 is driven by the turbine 13 to generate the current supplied to the electrode 3 in order to melt the charge 12 in the manner described above with reference to FIG. 2. In response to the various data transmitted from the transmission lines 21, the power-factor meter 20 and the power meter 19, the total system controller 18 controls the frequency and the voltage through the automatic voltage regulator 17 so that the optimum operating conditions of the electric smelting furnace may be maintained. The total system controller 18 also controls the charge of the raw materials into the furnace, the supply of the self-burning electrode agent, and the position of the hollow electrode 3. Thus, the optimum operating conditions of the electric smelting furnace may be maintained.

So far the present invention has been described as being applied to the iron and steelmaking process, but it will be understood that the electric smelting furnace in accordance with the present invention may be used in electric arc furnaces in mini-mills and for producing various alloys or carbides and that various modifications may be effected without departing the scope of the present invention.

The advantages of the electric furnace of the present invention may be summarized as follows:

(I) As compared with the conventional metallurgical processes, the restrictions on the kinds, qualities, strength, and so on of the raw materials may be considerably relaxed.

(II) The breakdown of the center of the conventional carbon electrodes may be eliminated so that a large-diameter electrode with a large current capacity may be used.

(III) The hollow portion of the electrode is used as a reaction chamber or column so that the thermal efficiency and hence the productivity may be considerably improved with the result in a reduction in running cost, a saving of energy and minimized atmosphere pollution.

(IV) As compared with blast furnaces, the flexibility in production capacity, operation and so on may be attained, and the production capacity may be easily adjusted so that an electric smelting furnace in accordance with the present invention may be well adapted for use in the mini-mill.

(V) As compared with the steelmaking line consisting of the direct reduction process and the electric arc furnace, high quality steel may be produced and thermal energy saving may be attained.

(VI) Since a generator is included, the optimum control of the voltage and frequency may be attained, and the optimum, automatic and stabilized operation may be carried out because various data may be fed into the total system controller.

(VII) Also when furnace off-gases are recovered, such gases may be used as the fuel for driving the generator and other devices.

(VIII) The electric smelting furnace in accordance with the present invention may be used in conjunction with the iron and steel manufacturing processes utilizing atomic energy to be developed in the future.

What is claimed is:

1. An electric smelting furnace having a vertically positioned hollow electrode therein, the lower end of the electrode being spaced a predetermined distance from the furnace bottom, the wall thickness of the electrode depending upon the depth of current penetration into the electrode as determined by the equation:

$$\delta \approx 5030 \sqrt{\rho/\mu f} \, (cm)$$

$\rho$: Specific resistance of the electrode ($\Omega$-cm)
$\mu$: Specific permeability of the electrode
$f$: Frequency, cycles per second, and conduit means for discharging furnace off-gases and for charging raw materials into the furnace through said hollow electrode, said gases serving to pre-heat the raw materials.

2. An electric smelting furnace as set forth in claim 1 further including means for charging a self-burning electrode agent into said hollow electrode.

3. The smelting furnace as set forth in claim 1 which includes duct means aligned with said conduit means and an electrically insulated flexible tube connecting the conduit means and the duct means.

4. The smelting furnace as set forth in claim 2 which includes duct means aligned with said conduit means and an electrically insulated flexible tube connecting the conduit means and the duct means.

5. An electric smelting furnace as set forth in claim 1 further including a water cooling device for cooling said hollow electrode.

6. An electric smelting furnace as set forth in claim 2 further including a water cooling device for cooling said hollow electrode.

7. An electric smelting furnace as set forth in claim 3 further including a water cooling device for cooling said hollow electrode.

8. An electric smelting furnace as set forth in claim 4 further including a water cooling device for cooling said hollow electrode.

9. An electric smelting furnace as set forth in claim 1 wherein said hollow electrode is electrically connected to a generator through a total system controller so that the optimum frequency and current for the operation of the furnace may be supplied from said generator to said hollow electrode.

10. An electric smelting furnace as set forth in claim 2 wherein said hollow electrode is electrically connected to a generator through a total system controller so that the optimum frequency and current for the operation of the furnace may be supplied from said generator to said hollow electrode.

* * * * *